US012785370B2

(12) United States Patent
Illg

(10) Patent No.: US 12,785,370 B2
(45) Date of Patent: Nov. 3, 2026

(54) CABLE JACKET REMOVAL DEVICE

(71) Applicant: MILWAUKEE ELECTRIC TOOL CORPORATION, Brookfield, WI (US)

(72) Inventor: Joseph C. Illg, Grafton, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 98 days.

(21) Appl. No.: 18/758,459

(22) Filed: Jun. 28, 2024

(65) Prior Publication Data

US 2025/0007260 A1 Jan. 2, 2025

Related U.S. Application Data

(60) Provisional application No. 63/511,025, filed on Jun. 29, 2023.

(51) Int. Cl.

| | |
|---|---|
| ***H02G 1/12*** | (2006.01) |
| ***B23D 17/00*** | (2006.01) |
| ***B23D 21/04*** | (2006.01) |

(52) U.S. Cl.

CPC ........... *H02G 1/1297* (2013.01); *B23D 17/00* (2013.01); *B23D 21/04* (2013.01)

(58) Field of Classification Search

CPC ........ H02G 1/297; H02G 1/224; H02G 1/236; H02G 1/226; H02G 1/127; H01G 1/229; H01G 1/265; G02B 6/245

USPC ........ 30/90.1, 90.6, 90.7, 91.1, 92, 93, 95.2, 30/278, 289; 81/9.44, 9.4; 82/54, 70.2, 82/113

See application file for complete search history.

(56) References Cited

U.S. PATENT DOCUMENTS

| | | | | |
|---|---|---|---|---|
| 2,176,646 | A | | 10/1939 | Thatcher |
| 2,396,442 | A | | 3/1946 | Eugene et al. |
| 2,687,560 | A | | 8/1954 | St. Palley |
| 3,273,236 | A | | 9/1966 | McDowell |
| 3,572,189 | A | * | 3/1971 | Matthews ............ H02G 1/1226 30/90.1 |
| 3,581,608 | A | | 6/1971 | Baker |
| 3,623,384 | A | * | 11/1971 | Murphy ............... H02G 1/1229 30/90.6 |
| 3,816,915 | A | | 6/1974 | Bieganski |
| 3,959,877 | A | | 6/1976 | Zorzenon |
| 4,027,557 | A | | 6/1977 | Stepan |
| 4,062,110 | A | | 12/1977 | Alvarez |
| 4,074,544 | A | | 2/1978 | Luthi |

(Continued)

FOREIGN PATENT DOCUMENTS

| | | |
|---|---|---|
| CN | 201829799 A | 5/2011 |
| CN | 202721388 U | 2/2013 |

(Continued)

*Primary Examiner* — Ghassem Alie

(74) *Attorney, Agent, or Firm* — Michael Best & Friedrich LLP

(57) ABSTRACT

A cable stripping assembly is used for removing a cable jacket from a cable. The assembly includes a main body extending along a central axis and including a cavity configured to receive the cable. A window in the main body is in communication with the cavity. A blade including a cutting edge is coupled to the main body adjacent the window. The cutting edge is at least partially in the cavity. The blade is rotatable relative to the main body about a pivot axis to vary a distance between the cutting edge and the central axis.

7 Claims, 13 Drawing Sheets

(56) References Cited

U.S. PATENT DOCUMENTS 4,117,749 A * 10/1978 Economu ............. H02G 1/1229 30/90.6
4,267,636 A 5/1981 Ducret
4,736,501 A 4/1988 Fujimoto
4,869,135 A * 9/1989 Hoffa ................... H02G 1/1265 81/9.51
4,876,792 A 10/1989 Black
4,901,438 A 2/1990 Gibney
4,979,307 A 12/1990 Ste. Marie
4,987,801 A 1/1991 Brown
5,070,615 A 12/1991 Michael, III
5,140,873 A 8/1992 Schwartzman
5,581,885 A 12/1996 Dalton
5,673,486 A 10/1997 Brown
5,950,505 A 9/1999 Locher
6,044,744 A 4/2000 Eslambolchi et al.
6,311,600 B1 11/2001 Lo et al.
6,330,839 B1 12/2001 Amrein
6,370,759 B1 4/2002 Shimizu
6,381,850 B1 5/2002 Warner
6,561,061 B1 5/2003 Stepan
6,668,458 B1 12/2003 Schoenleber
7,228,763 B2 6/2007 Hughes et al.
7,984,553 B1 * 7/2011 Miller .................. H02G 1/1265 30/90.1
8,544,364 B2 10/2013 Michaels
8,739,657 B2 6/2014 Nakamura
9,270,095 B2 2/2016 Johnston
9,520,700 B2 12/2016 Stepan et al.
10,033,167 B1 7/2018 Devita et al.
10,256,612 B2 4/2019 Houser et al.
10,404,044 B2 9/2019 Smith
10,978,860 B1 4/2021 Wendt
11,258,238 B2 2/2022 Zick et al.
11,276,993 B2 3/2022 Sedlacek
11,450,449 B2 9/2022 Silberbauer
11,539,193 B2 12/2022 Smith
11,689,003 B2 6/2023 Weber et al.
11,984,712 B2 5/2024 Smith
2005/0066528 A1 3/2005 Ducret
2010/0269637 A1 * 10/2010 Wirth ................... H02G 1/1226 81/9.51
2012/0124841 A1 5/2012 Ducret
2013/0074345 A1 * 3/2013 Zick ..................... H02G 1/1221 83/13
2017/0040783 A1 * 2/2017 Troy .................... H02G 1/1226
2018/0062362 A1 3/2018 Muston
2018/0183221 A1 6/2018 Wilcox
2020/0076172 A1 3/2020 Weber et al.
2020/0373745 A1 11/2020 Galindo Gonzalez
2022/0069552 A1 * 3/2022 Morris ................... H02G 1/005
2022/0158423 A1 5/2022 Sedlacek
2023/0070686 A1 3/2023 Smith
2023/0275408 A1 8/2023 Weber et al.
2024/0106210 A1 3/2024 Henton et al.

FOREIGN PATENT DOCUMENTS

CN 203813339 U 9/2014
CN 203967639 U 11/2014
CN 204012489 U 12/2014
CN 104393540 A 3/2015
CN 204559017 U 8/2015
CN 204885796 U 12/2015
CN 205159941 U 4/2016
CN 105591328 A 5/2016
CN 105790168 A 7/2016
CN 205565538 U 9/2016
CN 205595706 U 9/2016
CN 106253157 A 12/2016
CN 206041377 U 3/2017
CN 106877119 A 6/2017
CN 106998047 A 8/2017
CN 206432551 U 8/2017
CN 107240894 A 10/2017
CN 206775019 U 12/2017
CN 107658801 A 2/2018
CN 107681562 A 2/2018
CN 107785816 A 3/2018
CN 108054681 A 5/2018
CN 108321732 A 7/2018
CN 108429197 A 8/2018
CN 108471194 A 8/2018
CN 108539668 A 9/2018
CN 108666937 A 10/2018
CN 108711789 A 10/2018
CN 207977674 U 10/2018
CN 108808575 A 11/2018
CN 108899811 A 11/2018
CN 208226464 U 12/2018
CN 109119946 A 1/2019
CN 109244936 A 1/2019
CN 109244967 A 1/2019
CN 109274041 A 1/2019
CN 109473914 A 3/2019
CN 109510118 A 3/2019
CN 109510120 A 3/2019
CN 109616957 A 4/2019
CN 109616961 A 4/2019
CN 109638733 A 4/2019
CN 109687354 A 4/2019
CN 109861059 A 6/2019
CN 208955403 U 6/2019
CN 110048342 A 7/2019
CN 209104700 U 7/2019
CN 209150622 U 7/2019
CN 110137864 A 8/2019
CN 110224345 A 9/2019
CN 110350448 A 10/2019
CN 209526439 U 10/2019
CN 110518502 A 11/2019
CN 209786654 U 12/2019
CN 110676768 A 1/2020
CN 110676769 A 1/2020
CN 110707608 A 1/2020
CN 209896596 U 1/2020
CN 209948542 U 1/2020
CN 110854749 A 2/2020
CN 110943355 A 3/2020
CN 110994480 A 4/2020
CN 111082370 A 4/2020
CN 210350649 U 4/2020
CN 111130025 A 5/2020
CN 111313334 A 6/2020
CN 210838715 U 6/2020
CN 210939453 U 7/2020
CN 211208882 U 8/2020
CN 211266279 U 8/2020
CN 211266280 U 8/2020
CN 211320784 U 8/2020
CN 211351528 U 8/2020
CN 111614027 A 9/2020
CN 111725743 A 9/2020
CN 211629740 U 10/2020
CN 211790457 U 10/2020
CN 111934242 A 11/2020
CN 111969502 A 11/2020
CN 111987650 A 11/2020
CN 112018667 A 12/2020
CN 112103754 A 12/2020
CN 112152156 A 12/2020
CN 212435246 U 1/2021
CN 112398041 A 2/2021
CN 112490951 A 3/2021
CN 112490953 A 3/2021
CN 112600132 A 4/2021
CN 112736788 A 4/2021
CN 112757359 A 5/2021
CN 112803310 A 5/2021
CN 112847543 A 5/2021
CN 112864959 A 5/2021
CN 113013793 A 6/2021
CN 113300287 A 8/2021

(56) References Cited

FOREIGN PATENT DOCUMENTS

| | | | |
|---|---|---|---|
| CN | 213906135 | U | 8/2021 |
| CN | 214013715 | U | 8/2021 |
| CN | 214043257 | U | 8/2021 |
| CN | 113394719 | A | 9/2021 |
| CN | 113437703 | A | 9/2021 |
| CN | 113500651 | A | 10/2021 |
| CN | 214479148 | U | 10/2021 |
| CN | 113594829 | A | 11/2021 |
| CN | 214644019 | U | 11/2021 |
| CN | 214850162 | U | 11/2021 |
| CN | 113794165 | A | 12/2021 |
| CN | 113794166 | A | 12/2021 |
| CN | 113922287 | A | 1/2022 |
| CN | 113937672 | A | 1/2022 |
| CN | 113991551 | A | 1/2022 |
| CN | 113991554 | A | 1/2022 |
| CN | 114094505 | A | 2/2022 |
| CN | 114094507 | A | 2/2022 |
| CN | 215772287 | U | 2/2022 |
| CN | 215817276 | U | 2/2022 |
| CN | 215897167 | U | 2/2022 |
| CN | 216289926 | U | 4/2022 |
| CN | 114798969 | A | 7/2022 |
| CN | 114825186 | A | 7/2022 |
| CN | 115000887 | A | 9/2022 |
| CN | 115051289 | A | 9/2022 |
| CN | 115065001 | A | 9/2022 |
| CN | 115065002 | A | 9/2022 |
| CN | 115085100 | A | 9/2022 |
| CN | 115133459 | A | 9/2022 |
| CN | 115149465 | A | 10/2022 |
| CN | 115173324 | A | 10/2022 |
| CN | 115173327 | A | 10/2022 |
| CN | 115186774 | A | 10/2022 |
| CN | 115241806 | A | 10/2022 |
| CN | 115241811 | A | 10/2022 |
| CN | 217545424 | U | 10/2022 |
| CN | 115275880 | A | 11/2022 |
| CN | 218449207 | U | 2/2023 |
| CN | 115733098 | A | 3/2023 |
| CN | 115764723 | A | 3/2023 |
| CN | 218648477 | U | 3/2023 |
| DE | 4410967 | A1 | 10/1995 |
| DE | 29919682 | U1 | 3/2000 |
| DE | 10029786 | A1 | 4/2002 |
| DE | 102007021638 | B3 | 10/2008 |
| DE | 202021103485 | U1 | 8/2021 |
| DE | 102020126487 | A1 | 4/2022 |
| WO | WO9738477 | A1 | 10/1997 |
| WO | WO9934493 | A1 | 7/1999 |
| WO | WO2013009167 | A1 | 1/2013 |
| WO | WO2021068590 | A1 | 4/2021 |
| WO | WO2022036771 | A1 | 2/2022 |
| WO | WO2022073743 | A1 | 4/2022 |
| WO | WO2022105311 | A1 | 5/2022 |
| WO | WO2022127982 | A1 | 6/2022 |
| WO | WO2023031395 | A1 | 3/2023 |

* cited by examiner

CABLE JACKET REMOVAL DEVICE

CROSS REFERENCE TO RELATED APPLICATIONS

This application claims priority to U.S. Provisional Patent No. 63/511,025, filed Jun. 29, 2023, the entire contents of which is incorporated herein by reference.

BACKGROUND

Electrical cables and wires commonly include an insulative cable jacket surrounding a plurality of conductive wires. In order to access the conductive wires, for example to connect an end of one cable to another cable or to a junction box, the cable jacket must be removed from a portion of the cable, exposing the wires. The disclosure relates generally to electric wire strippers, and more particularly to stripping assemblies including bushings for use with electric stripper tools to remove an insulative jacket from a cable to expose the conductive wires. Typical electric wire strippers include a motor unit as part of a kit including a plurality of bushings each corresponding to a different type of cable (e.g., a different size or material).

SUMMARY

In one aspect, the disclosure provides a cable stripping assembly used for removing a cable jacket from a cable. The assembly includes a main body extending along a central axis and including a cavity configured to receive the cable. A window in the main body is in communication with the cavity. A blade including a cutting edge is coupled to the main body adjacent the window. The cutting edge is at least partially in the cavity. The blade is rotatable relative to the main body about a pivot axis to vary a distance between the cutting edge and the central axis.

In another independent aspect, the disclosure provides a cable stripping assembly for removing a cable jacket from a cable. The assembly includes a main body extending along a central axis and having a cavity configured to receive the cable. A blade is mounted to the main body and configured to partially extend into the cavity to engage the cable. A clamp assembly is coupled to the main body, the clamp assembly including a plurality of jaws, a jaw carrier, and a guide plate. Each jaw of the plurality of jaws includes a clamp surface configured to engage the cable. The jaw carrier includes a plurality of cradles, each cradle of the plurality of cradles configured to receive an associated one of the plurality of jaws. Rotation of the guide plate relative to the jaw carrier moves the plurality of jaws into the cavity to engage the cable. In another independent aspect, the disclosure provides a cable stripping assembly for removing a cable jacket from a cable. The assembly includes a cable stripping tool and an adjustable bushing. The cable stripping tool includes a housing including a handle and a head, an output end disposed on the head, and a motor disposed in the housing. Actuation of the motor drives the output end to rotate. The adjustable bushing extends along a central axis between a first end and a second end. The adjustable bushing is configured to removably couple to the cable stripping tool. The adjustable bushing includes a main body, a cavity extending along the central axis, and a tool adapter disposed at the second end of the adjustable bushing. The tool adapter engages the output end of the cable stripping tool to rotate the main body about the central axis. An adjustable blade assembly is coupled to the main body and includes a blade at least partially extending into the cavity. The adjustable blade assembly varies a cutting depth of the blade. A clamp assembly is coupled to the main body and includes an opening to the cavity and a plurality of jaws configured to move radially to engage the cable received in the cavity.

The features, functions, and advantages described herein may be achieved independently in various embodiments of the present disclosure or may be combined in yet other embodiments, further details of which may be seen with reference to the following description and drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that certain features are described in reference to certain embodiments but are not limited to application in that embodiment and may be incorporated into other embodiments, both explicitly disclosed and not disclosed.

DETAILED DESCRIPTION

Exemplary cable jacket removal systems or cable stripping systems and more particularly, exemplary bushings for use with cable jacket removal devices or cable stripping tools are described herein.

As used herein, an element of step recited in the singular and proceeded with the word "a" or "an" should be understood as not excluding plural elements or steps unless such exclusion is explicitly recited. Furthermore, references to "one embodiment" of the present disclosure or the "exemplary embodiment" are not intended to be interpreted as excluding the existence of additional embodiments that also incorporate the recited features.

Figure 1:
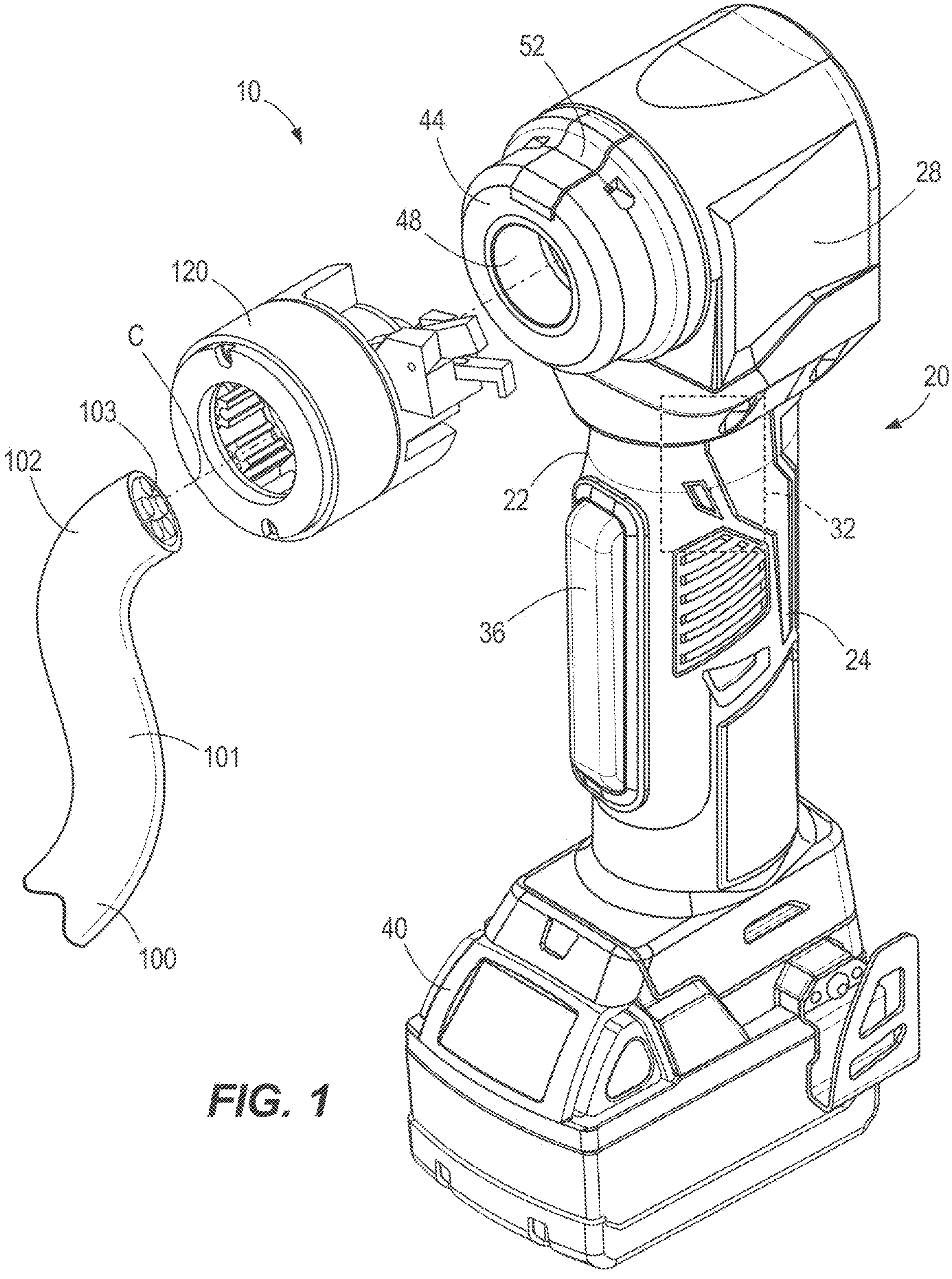
FIG. 1 is a perspective view of a cable stripping assembly including a cable stripping tool and a bushing.

FIG. 1 illustrates a cable stripping assembly 10 having a cable stripping tool 20 and an adjustable bushing 120 removably coupled to the cable stripping tool 20. The cable stripping tool 20 drives the adjustable bushing 120 to rotate about a central axis C thereof. In the illustrated embodiment, the cable stripping tool 20 is a motor unit intended for use in cable stripping operations. In some embodiments, the cable stripping tool 20 may include any motor unit capable of transmitting rotation to the adjustable bushing 120. Additionally, while one exemplary cable stripping tool 20 is illustrated, other embodiments of tools intended for use in cable stripping may be used. The included details regarding the tool 20 are provided to give context and not to limit the scope of the disclosure.

As illustrated in FIG. 1, the cable stripping tool 20 includes a housing 22 having a handle 24 and a head 28 coupled to the handle 24 to form a generally T-shaped configuration. A motor 32 is disposed in the housing 22 and may be positioned in the handle 24 or in the head 28. The handle 24 includes a trigger 36 coupled to the motor 32 to actuate the motor 32. Upon actuation of the trigger 36, power from a battery 40 is provided to the motor 32. The battery 40 may be attached to the handle 24 at an opposite end from the head 28. The battery 40 may be a removable, rechargeable lithium-ion battery pack. The motor 32 is operable to drive an output end 44 of the head 28 to rotate. The motor 32 may be connected to the output end 44 by a drive train (not shown) that may adjust the torque or speed provided to the output end 44. In some embodiments, the drive train simply transmits the rotation from the motor 32 to the output end 44 without significant power adjustment. The cable stripping tool 20 includes a receiving channel 48 in the output end 44 for coupling to the bushing 120. The bushing 120 may be one of a set or plurality of interchangeable bushings that, along with the tool 20, form a cable stripping kit. The bushing 120 is removably coupled to the output end 44 by a retaining feature 52 and is coupled for corotation with the output end 44.

Also seen in FIG. 1 is an exemplary cable 100. The cable stripping assembly 10 is configured to strip an end portion 102 of the cable 100. The cable 100 includes a plurality of wires 103 surrounded by a cable jacket 101. The adjustable bushing 120 engages the end 102 of the cable 100 and, when driven to rotate, removes the cable jacket 101 from the end 102 of the cable 100 to expose the wires 103. An operator can then electrically connect the cable 100 to another component via the exposed wires 103.

Figure 2:
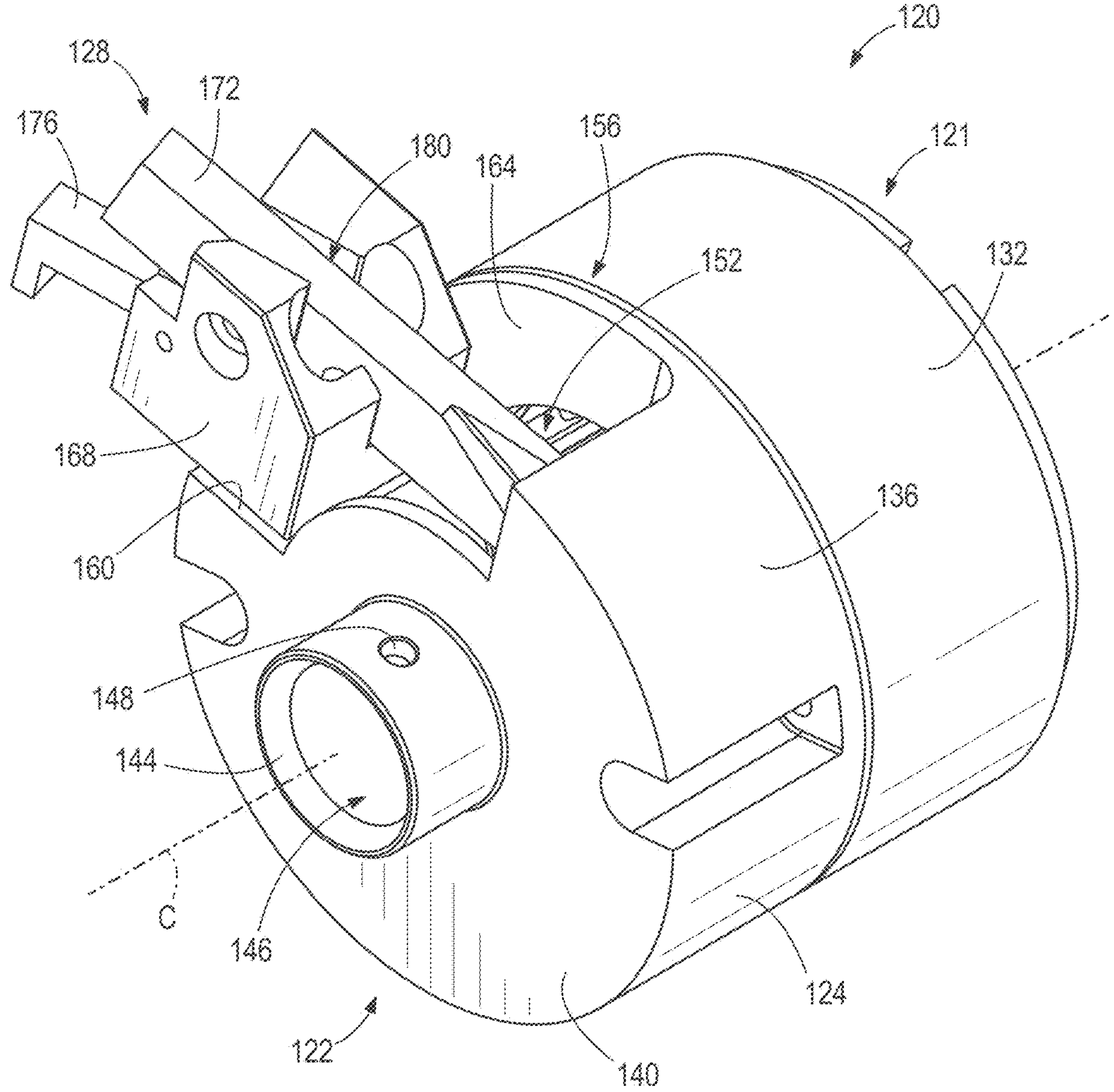
FIG. 2 is a perspective view of the bushing of FIG. 1, the bushing having a blade assembly, a main body, and a clamp assembly.

FIG. 2 is a perspective view of the adjustable bushing 120. The adjustable bushing 120 extends between a first end 121 and a second end 122 along the central axis C. The adjustable bushing 120 is generally hollow and defines a cavity 152. The cavity 152 extends along the central axis C and is configured to receive a cable (e.g., the cable 100) during a cable stripping operation. The adjustable bushing 120 includes a main body 124, a clamp assembly 132 coupled to the main body 124 at the first end 121 of the bushing 120, and a blade assembly 128 coupled to the main body 124 adjacent the second end 122 of the bushing 120. The cable 100 is received through the first end 121 of the bushing 120 and the clamp assembly 132 engages the cable 100 in the cavity 152 to align and hold the cable 100 adjacent the blade assembly 128 which slices the cable jacket 101 of the cable 100. In some embodiments, the bushing 120 may include more components not shown herein.

Figure 3:
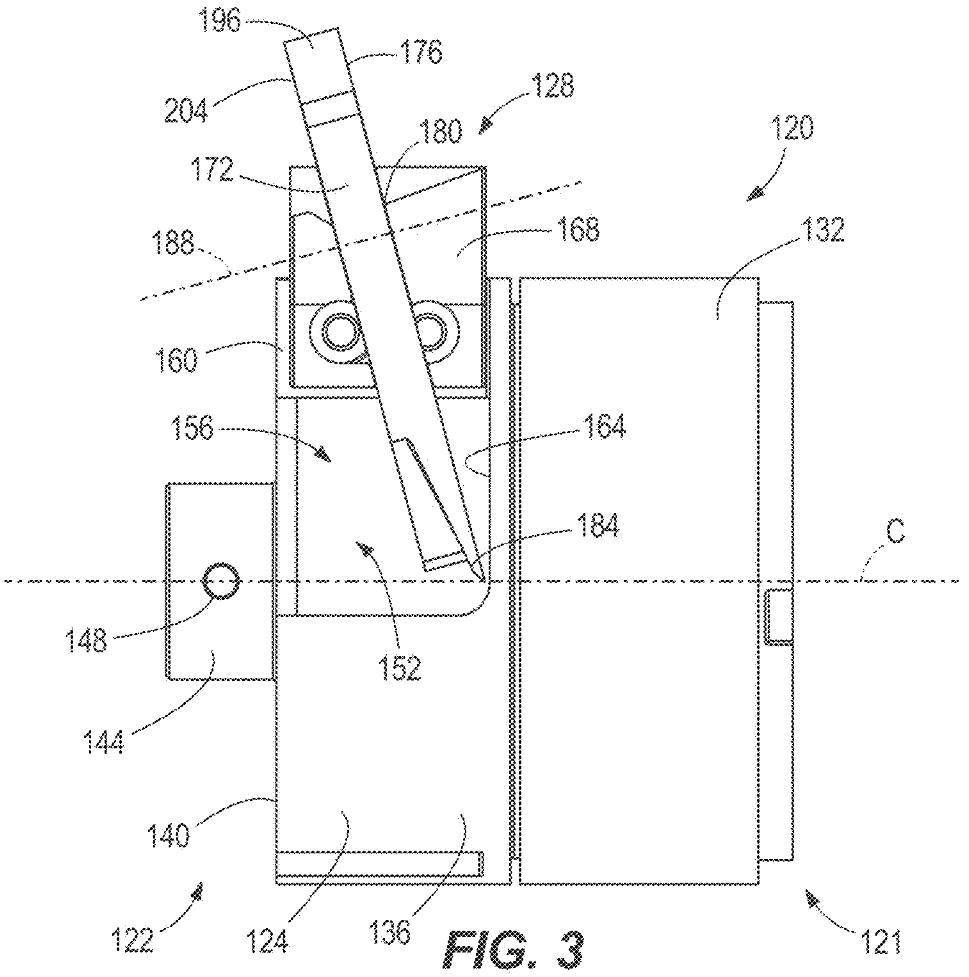
FIG. 3 is a side view of the bushing of FIG. 2 showing a cavity of the housing.

With reference to FIGS. 2 and 3, the main body 124 of the bushing 120 includes a generally cylindrical portion 136 and an end wall 140 cooperating to partially surround the cavity 152. The bushing 120 includes a tool adapter 144 at the second end 122 that receives transmitted rotation (e.g., from the cable stripping tool 20) and drives the bushing 120 to rotate about the central axis C. In the illustrated embodiment, the tool adapter 144 is part of the main body 124 and extends rearwardly from the end wall 140. The tool adapter 144 may be coupled to the output end 44 of the tool 20 to rotate therewith. In the illustrated embodiment, the tool adapter 144 is at least partially inserted into the receiving channel 48 of the tool 20. In some embodiments, the tool adapter 144 may be inserted into the receiving channel 48 until the end wall 140 contacts the output end 44. The tool adapter 144 is secured in the receiving channel 48 by the retaining feature 52 of the tool 20 to prevent unintentional disengagement of the bushing 120 from the tool 20. In some embodiments, the tool adapter 144 may include a coupling feature 148 that corresponds to the retaining feature 52 to inhibit axial decoupling of the bushing 120 from the tool 20. In the illustrated embodiment, the coupling feature 148 includes an aperture (e.g., configured to receive a detent pin). In some embodiments, the coupling feature 148 and/or the retaining feature 52 may also rotatably secure the adjustable bushing 120 for rotation with the output end 44 of the tool 20. In other embodiments, the adjustable bushing 120 may include a separate drive engagement feature to rotatably secure the bushing 120 to the output end 44. The separate drive engagement feature may be provided on the tool adapter 144 or elsewhere on the adjustable bushing 120. In the illustrated embodiment, the tool adapter 144 and the receiving channel 48 each have a generally circular profile. In other embodiments, the tool adapter 144 and receiving channel 48 may have corresponding non-circular profiles that act as the drive engagement feature to transmit rotation from the output end 44 of the tool 20 to the adjustable bushing 120. In other embodiments, the tool adapter 144 may be configured in any known way to connect the adjustable bushing 120 to the cable stripping tool 20 or another motor unit. As discussed above, in the illustrated cable stripping assembly 10, the cable stripping tool 20 is intended for use in a cable stripping operation with cable stripping bushings like the adjustable bushing 120. The tool adapter 144 includes an opening 146 to the cavity 152. In situations where a long length of cable 100 needs to be stripped, the cable 100 may continue through the opening 146 and into the receiving channel 48 of the tool 20. The receiving channel 48 may include an open end on the opposite side of the head that allows the cable 100 to continue out of the tool 20.

With continued reference to FIGS. 2-3, the blade assembly 128 is coupled to the main body 124 to at least partially extend into the cavity 152. Specifically, the main body 124 includes a cut-out portion 156 or window 156 cut into the cylindrical portion 136. The window 156 is in communication with the cavity 152 and the blade assembly 128 is coupled to the main body 124 adjacent the window 156. The blade assembly 128 includes a mounting block 168 coupled to the window 156. In the illustrated embodiment, the window 156 includes at least one side wall 160 and an end wall 164. The mounting block 168 is secured to the side wall 160 (e.g., by screws) adjacent the end wall 164 (see FIG. 6). The blade assembly 128 is an adjustable blade assembly 128 and includes a blade 172 and an adjustment bar 176. The blade 172 and adjustment bar 176 are each movably coupled to the mounting block 168. The blade 172 extends from the mounting block 168 to a distal end 184 having a sharp cutting edge positioned in the cavity 152. The blade 172 and the adjustment bar 176 are coupled to the mounting block 168 in a channel 180. As seen best in FIG. 3, the channel 180 is inclined with respect to the mounting block 168 and the main body 124, such that when the blade assembly 128 is coupled to the main body 124, the distal end 184 of the blade 172 is closer to the first end 121 of the adjustable bushing 120 than the rest of the blade 172. The cutting edge on the distal end 184 is therefore angled to increase the effectiveness of the blade assembly 128.

Figure 4:
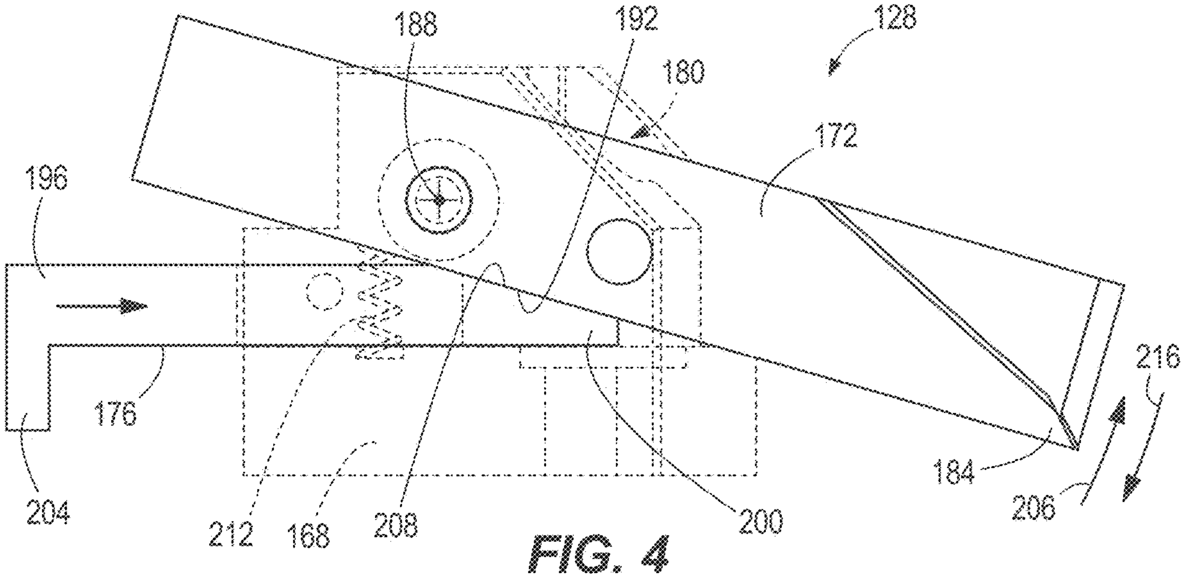
FIG. 4 is a top view of the blade assembly of FIG. 2.
Figure 5:
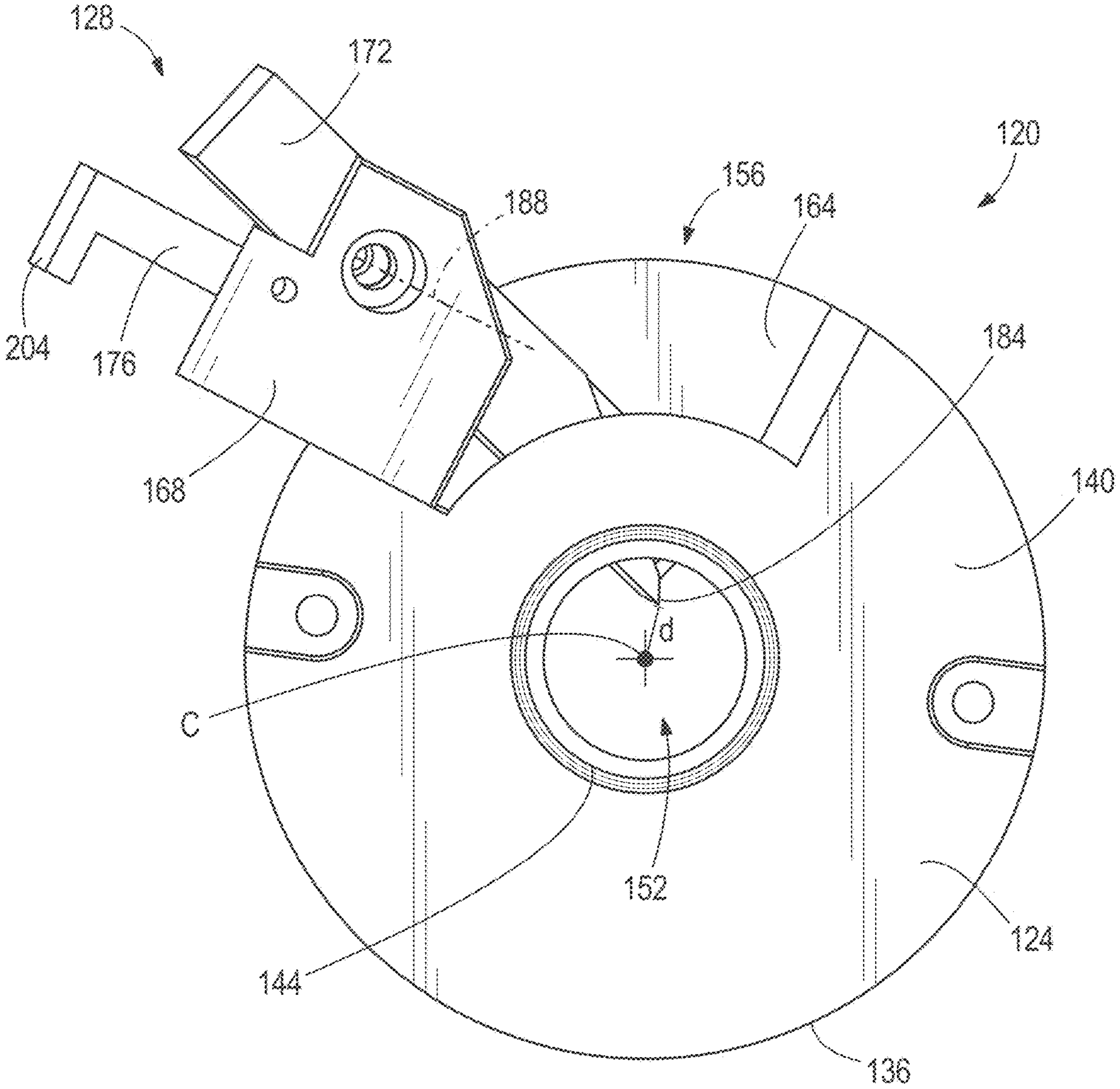
FIG. 5 is a top view of the bushing of FIG. 2.

With reference to FIGS. 3-5, the blade 172 is coupled to the mounting block 168 for rotation about a pivot axis 188. Rotation of the blade 172 occurs within an inclined plane defined by the channel 180. The channel 180 is inclined with respect to the end wall 140 of the main body 124 and the pivot axis 188 is inclined relative to the central axis C. In some embodiments, the blade 172 is removably coupled to the mounting block 168, for example, by a pivot pin, and may be removed and replaced as needed. The blade 172 is rotatable to adjust a cutting depth of the blade assembly 128. In other words, rotation of the blade 172 about the pivot axis 188 varies a radial distance d (FIG. 5) between the central axis C and the distal end 184. The cutting depth may be inversely related to the radial distance d (e.g., the cutting depth may be discussed as being shallower or decreased when the distance d is larger, and the cutting depth is increased or deeper when the distance d is smaller). The blade 172 includes a cam surface 192 spaced from the pivot axis 188. Force applied to the cam surface 192 causes the blade 172 to rotate and the distal end 184 to move. The adjustment bar 176 is supported in the channel 180 to slide relative to the mounting block 168 to contact or apply a force to the cam surface 192. The adjustment bar 176 slides within the inclined plane defined by the channel 180. The adjustment bar 176 extends between an outer end 196 and an inner end 200. The outer end 196 includes a tab 204 graspable by a user to position the adjustment bar 176 within the channel 180. In some embodiments, the position of the adjustment bar 176 may be maintained by a locking assembly (not shown). In some embodiments, the position of the adjustment bar 176 may be maintained by friction between the components of the blade assembly 128 or in other ways. As seen in FIG. 4, the inner end 200 of the adjustment bar 176 includes a wedge surface 208. The wedge surface 208 has an angled profile that engages the cam surface 192 of the blade 172 such that sliding movement of the adjustment bar 176 causes the blade 172 to rotate about the pivot axis 188. In the illustrated embodiment, inward movement of the adjustment bar 176 (e.g., movement of the tab 204 toward the central axis C) causes the blade 172 to pivot in a first direction 206 and moves the distal end 184 away from the central axis C. A biasing member 212 is positioned in the mounting block 168 to bias the blade 172 to pivot in a second direction 216 to rotate the distal end 184 toward the central axis C. The biasing member 212 also biases the blade 172 into engagement with the adjustment bar 176. In the illustrated embodiment, the biasing member 212 is a compression spring. In some embodiments, the biasing member 212 provides enough force to maintain the position of the blade 172 during a stripping operation. In other embodiments, the blade assembly 128 further includes a blade lock to prevent rotation of the blade 172 during operation. In some embodiments, the blade lock may involve tightening a pivot pin to clamp the blade to the mounting block 168.

The adjustable bushing 120 therefore includes a blade assembly 128 capable of varying the cutting depth (i.e., varying the radial distance d between the central axis C and the cutting edge of the distal end 184) in order to receive and strip multiple types of cables 100, for example, cables 100 with different diameters or having different thicknesses of the cable jacket 101. The blade assembly 128 is adjusted to the appropriate cutting depth to slice the cable jacket 101 without causing any damage to the wires 103 within.

Figure 6:
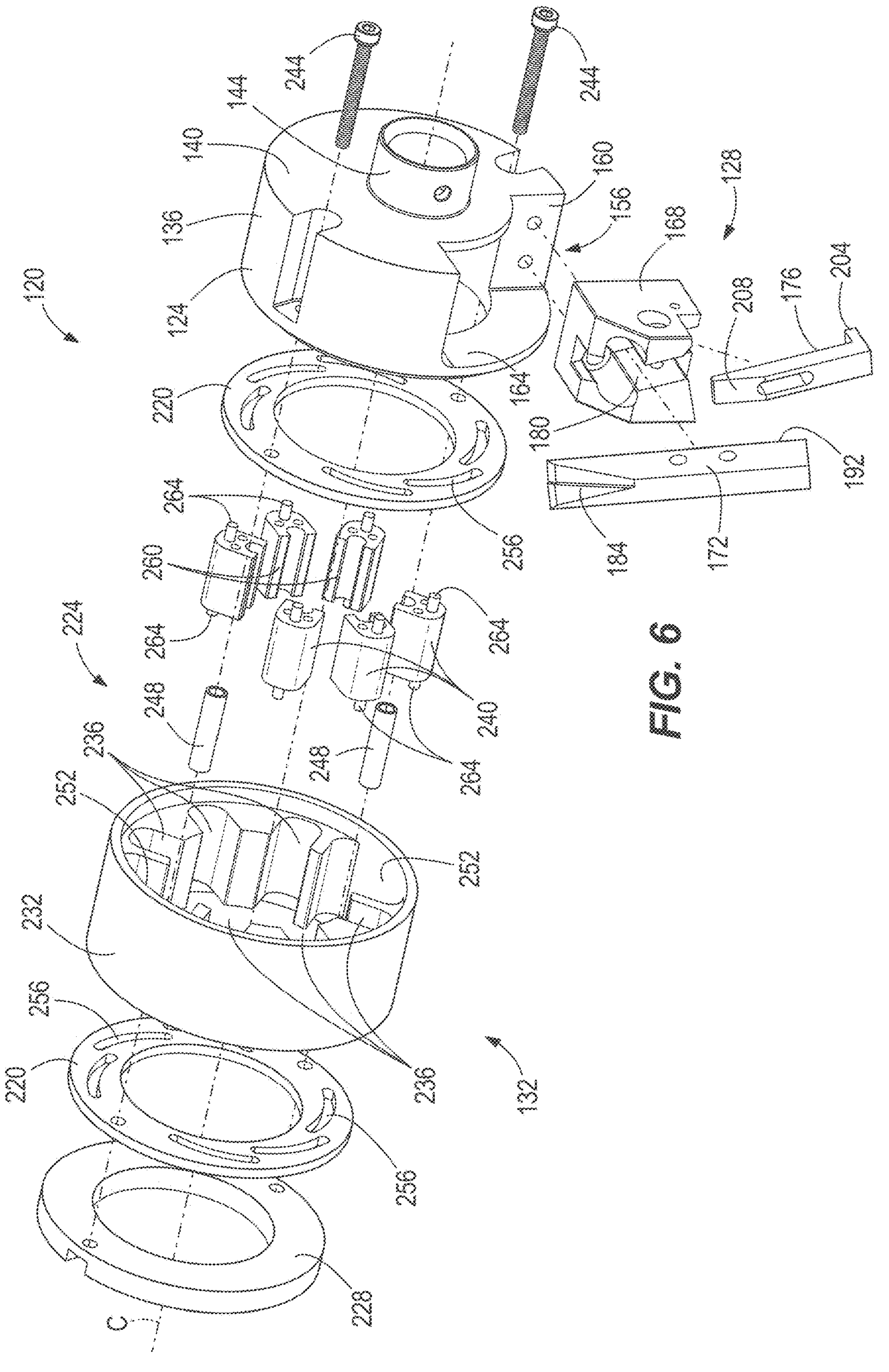
FIG. 6 is an exploded view of the bushing of FIG. 2.

In order to be able to successfully strip multiple types of cables 100, the adjustable bushing 120 further includes the clamp assembly 132 which is adjustable for holding and guiding cable of different diameters in the cavity 152. With reference to FIG. 6, the clamp assembly 132 includes a jaw assembly 224, a pair of guide plates 220 on either side of the jaw assembly 224, and an end plate 228. The clamp assembly 132 includes an opening 229 (FIG. 7) connected to the cavity 152. The cable 100 may be inserted into cavity 152 of the bushing 120 through the opening 229. Each of the pair of guide plates 220 includes a set of slots 256 extending through the guide plate 220. In the illustrated embodiment, the slots 256 extend fully through the guide plate 220. In some embodiments, the slots 256 may be formed in other ways, for example, recessed into a surface of the guide plate 220 like a groove or formed by rails extending from the surface of the guide plate 220. The jaw assembly 224 includes a jaw carrier 232 having a plurality of cradles 236 and a plurality of jaws 240 each movably supported in one of the plurality of cradles 236. Each jaw 240 includes at least one clamp surface 260 and a pair of pins 264 extending from opposite ends of the jaw 240. In the illustrated embodiment, the clamp assembly 132 is secured to the main body 124 by a pair of shafts 244. The shafts 244 extend through openings in the main body 124, the guide plates 220, and the end plate 228. In some embodiments, the shafts 244 are fasteners such as bolts or screws having a flanged head and a threaded portion. In other embodiments, the shafts may be otherwise secured to the main body 124 and the end plate 228. In other embodiments, the clamp assembly 132 may be coupled to the main body 124 in other ways, for example, using detent pins or snap rings.

Figure 7:
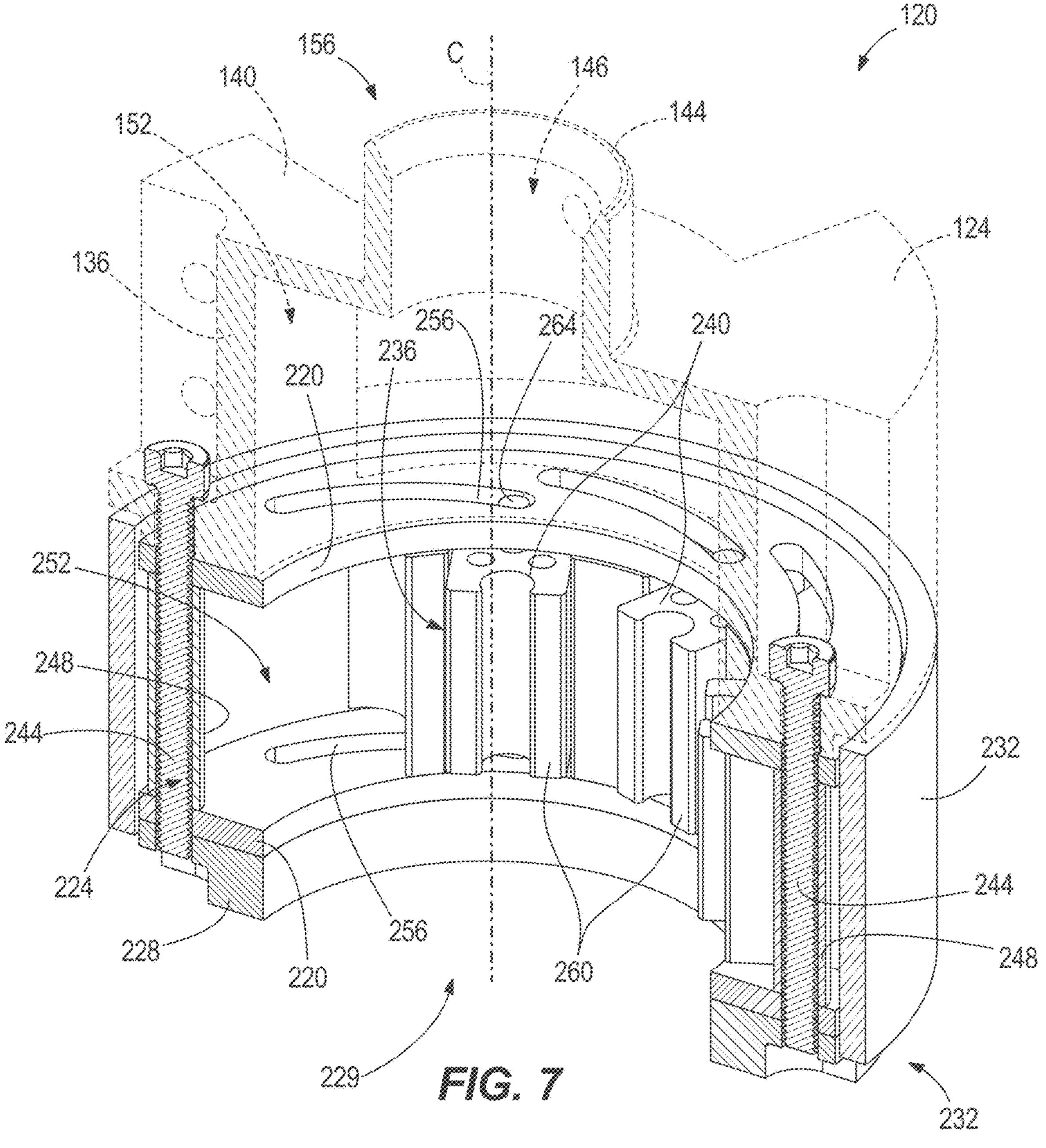
FIG. 7 is a perspective cutaway view of the clamp assembly and main body of the bushing of FIG. 2.

With reference to FIG. 7, when the clamp assembly 132 is assembled to the main body 124, the guide plates 220 and the end plate 228 are coupled to the main body 124 to rotate therewith. In the illustrated embodiment, the shafts 244 secure the guide plates 220 and the end plate 228 to rotate with the main body 124. The jaw assembly 224 is positioned between the pair of guide plates 220. The clamp assembly 132 further includes a pair of spacers 248 that surround a portion of the shafts 244 and are positioned between the guide plates 220. The spacers 248 are sized to be axially longer than the jaw carrier 232 to provide clearance so the jaw carrier 232 may rotate with respect to the main body 124 and the guide plates 220. In the illustrated embodiment, the jaw carrier 232 includes two notches 252 positioned between the cradles 236 to allow the spacer 248 to move within the jaw carrier 232. The notches 252 may in part define a range of motion of the jaw carrier 232. In the illustrated embodiment, the jaw assembly 224 includes six cradles 236 and six jaws 240. The cradles 236 are circumferentially spaced about the axis in two sets of three evenly spaced cradles 236. The notches 252 are positioned between the sets of cradles 236.

Each jaw 240 is coupled to an associated one of the slots 256 in each of the guide plates 220. Specifically, each jaw 240 is disposed between the guide plates 220 with the pins 264 positioned in the slots 256. The cradles 236 allow for sliding movement of the jaws 240 in a direction substantially toward the central axis C. In other words, the jaws 240 are movable within the cradles 236 in a radial direction with respect to the central axis C and are prevented from moving circumferentially relative to the jaw carrier 232 by the cradles 236. The cradles 236 support the jaws 240 to maintain an orientation of the jaws 240 with the clamp surface 260 generally facing the central axis C. In some embodiments, the jaws 240 may rotate slightly within the cradles 236 to attune the clamp surfaces 260 to engage the outer profile of the cable 100.

Figure 8:
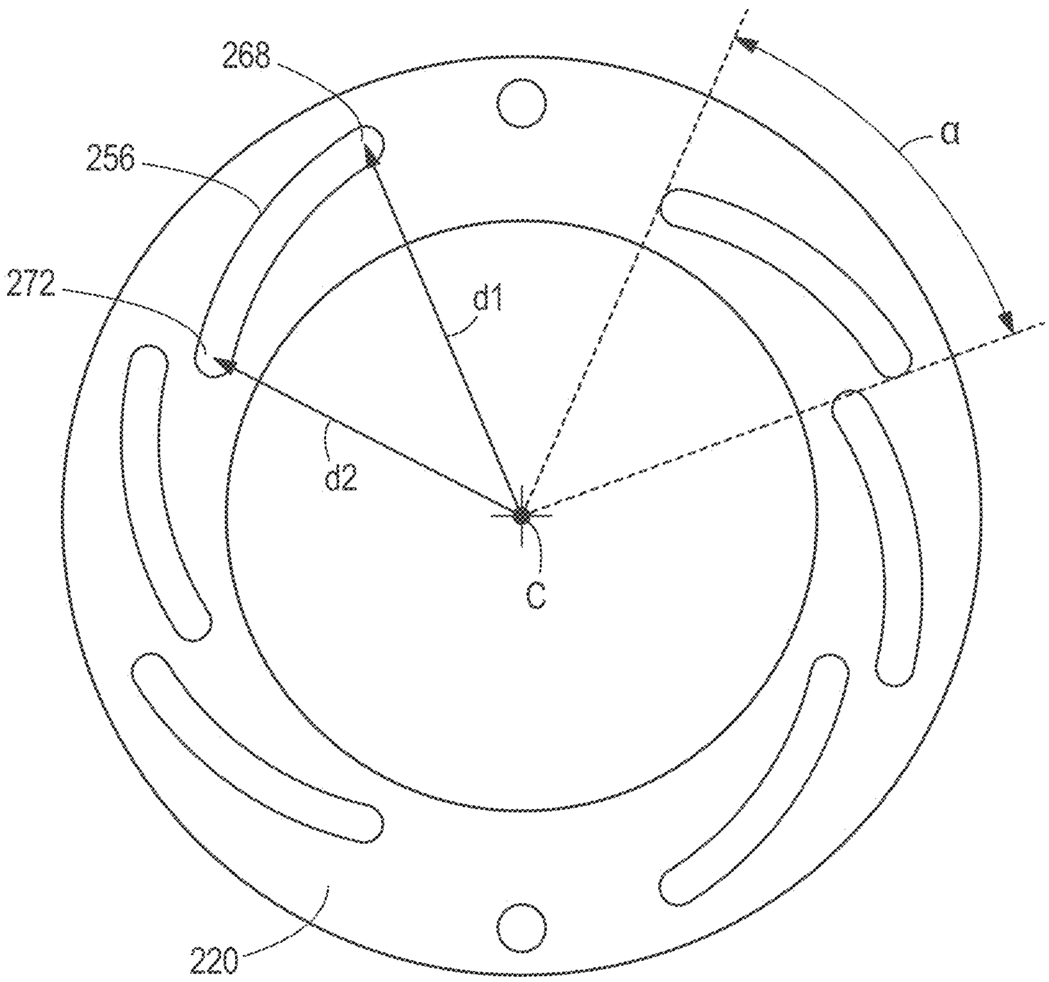
FIG. 8 is a bottom view of a guide plate of the clamp assembly of the bushing of FIG. 2.

With reference to FIG. 8, the slots 256 are arcuate slots and define a pathway including a circumferential component and a radial component. The jaws 240 are configured to travel along the pathway relative to the guide plates 220. In the illustrated embodiment, the guide plates 220 are identical and, when assembled, the slots 256 of each guide plate 220 are aligned. Each slot 256 extends between a first path end 268 and a second path end 272, and the jaws 240 travel along the pathway between the first path end 268 and the second path end 272. The first path end 268 is positioned at a first distance d1 from the central axis C, measured radially. The second path end 272 is positioned at a second distance d2 from the central axis C, measured radially. The first distance d1 and the second distance d2 are not equal to each other or, in other words, the pathway has radial variation; the jaws 240 move radially when the pins 264 travel along the slots 256. In the illustrated embodiment, the second distance d2 is smaller than the first distance d1 so the jaws 240 move radially inwardly as the pins 264 traverse the slot 256. Thus, the clamp surfaces 260 are able to move radially and enter the cavity 152 to engage the cable 100. In the illustrated embodiment, the curve of the slots 256 is such that the radial distance between the central axis C and the jaw 240 decreases constantly as the pins 264 travel along the pathway. In other embodiments, the slots 256 may have other shapes. In some embodiments, the radial distance may remain constant for a portion of the pathway. In some embodiments, the radial distance may both increase and decrease as the pin 264 traverses the slot 256 from the first path end 268 to the second path end 272. Still further shapes may be used to provide different clamping styles.

To operate the clamp assembly 132, the jaw carrier 232 is rotated about the central axis C relative to the main body 124 and to the guide plates 220. Rotation of the jaw carrier 232 causes the jaws 240 to move radially relative to the central axis C. Specifically, the jaw carrier 232 rotates the cradles 236 about the central axis C, and the cradles 236 apply a tangential force to the jaws 240. Since the jaws 240 are mounted in the slots 256 of the adjacent guide plates 220, the jaws 240 are carried radially by the slots 256 as the jaw carrier 232 rotates and moves the jaws 240 circumferentially. The cradles 236 maintain the orientation of the jaws 240 to keep the clamp surface 260 pointed toward the central axis C. In the illustrated embodiment, counter-clockwise rotation of the jaw carrier 232 about the central axis C (when viewed along the axis from the first end 121 as in FIGS. 8A-8C) causes the jaws 240 to move radially inward and extend into the cavity 152.

Figure 8A:
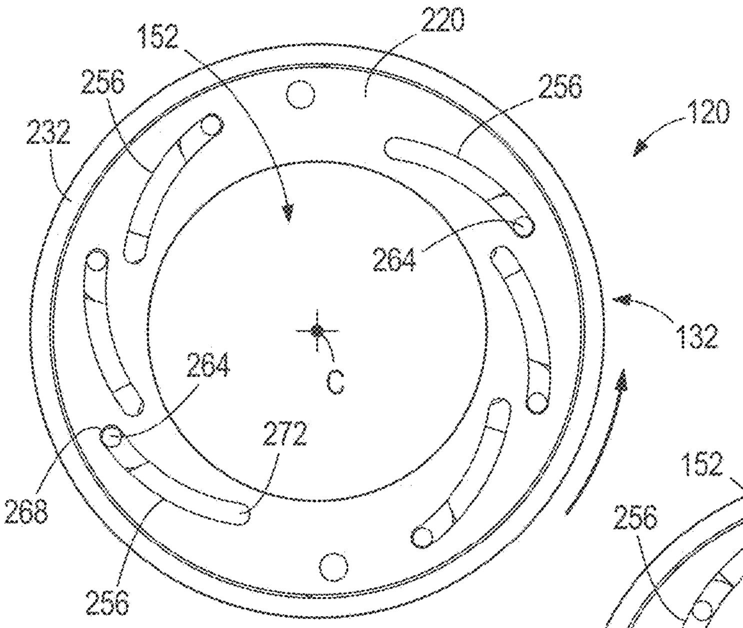
FIG. 8A is a bottom view of the clamp assembly of the bushing of FIG. 2, the clamp assembly in a first, retracted position.
Figure 8B:
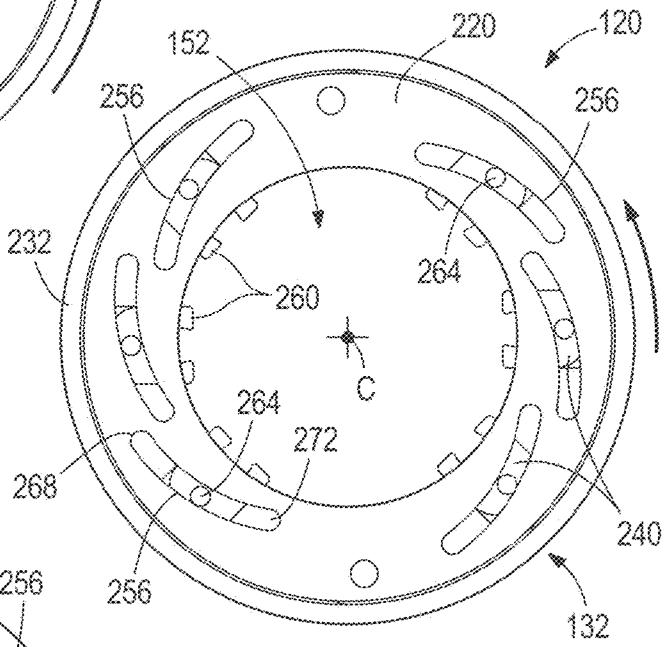
FIG. 8B is a bottom view of the clamp assembly of FIG. 8A in a second, intermediate position.
Figure 8C:
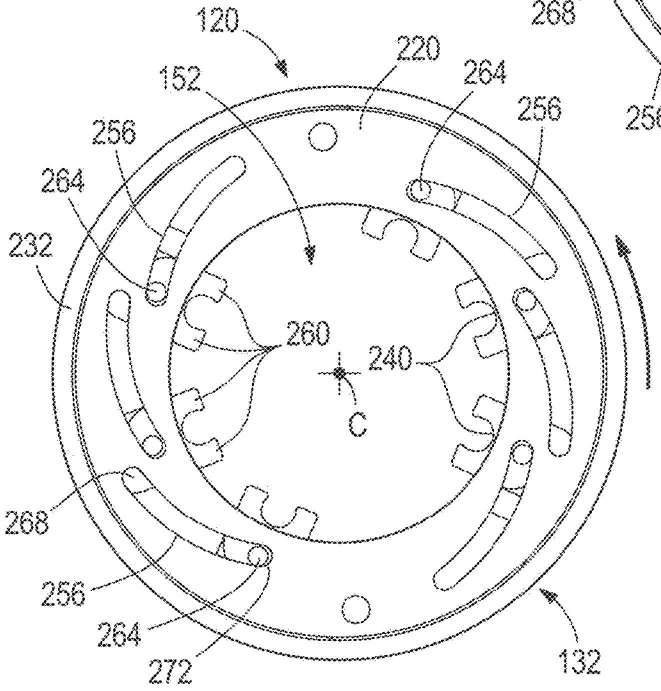
FIG. 8C is a bottom view of the clamp assembly of FIG. 8A in a third, extended position.
Figure 9A:
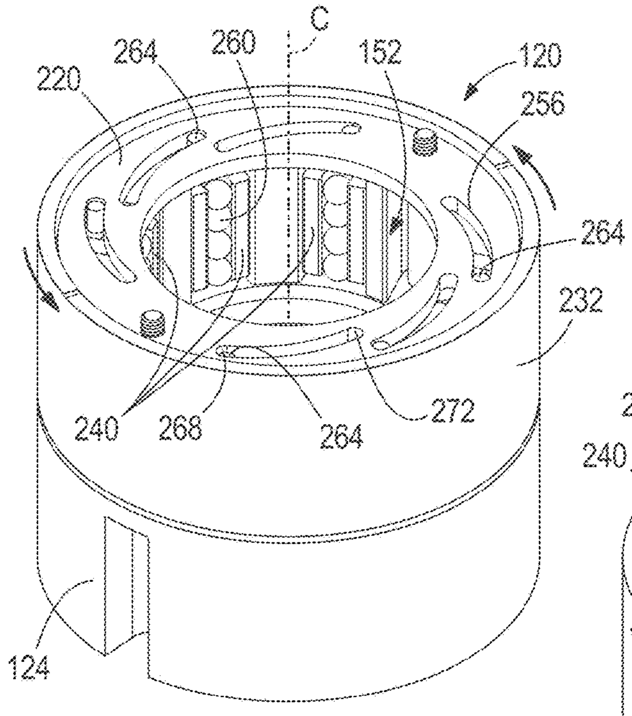
FIG. 9A is a perspective view of the clamp assembly of the bushing of FIG. 2, the clamp assembly in the first position.
Figure 9B:
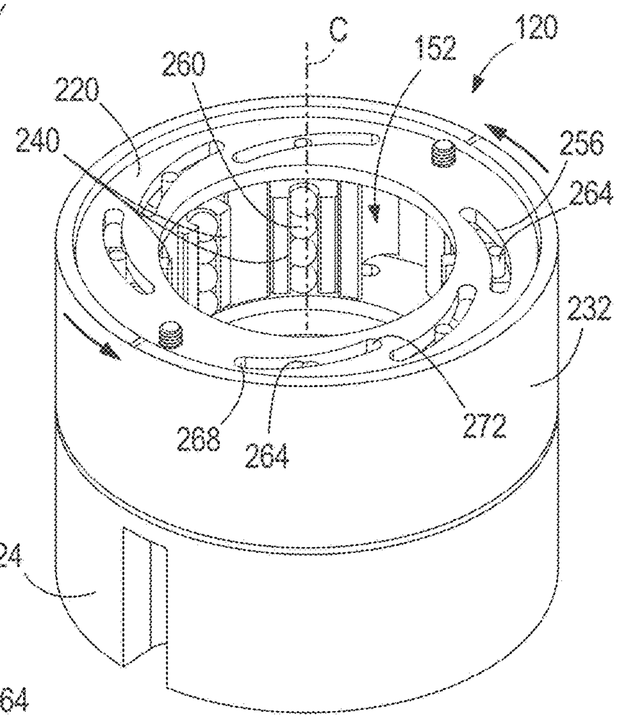
FIG. 9B is a perspective view of the clamp assembly of FIG. 9A in the second position.
Figure 9C:
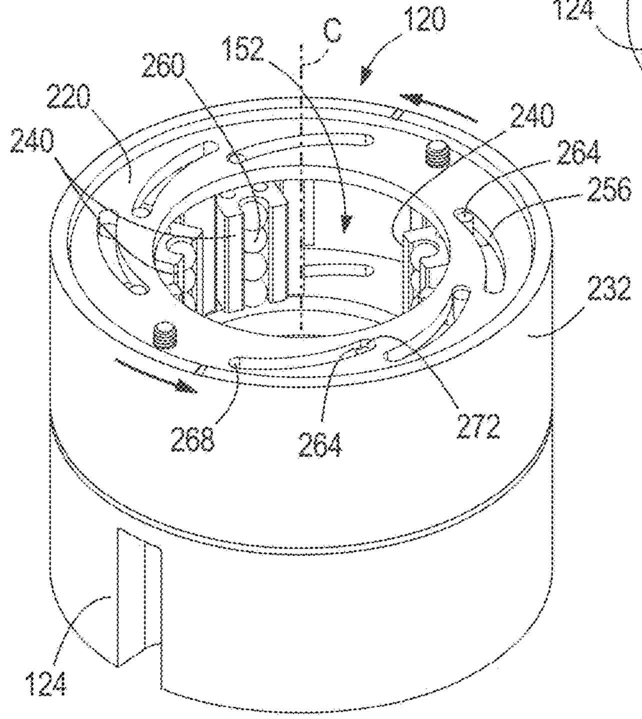
FIG. 9C is a perspective view of the clamp assembly of FIG. 9A in the third position.

With reference to FIGS. 8A-8C, the clamp assembly 132 is movable between an unclamped or retracted configuration and one or more clamped or extended configurations, in which at least a portion of the jaws 240 extend into the cavity 152 to engage the cable 100. The clamp assembly 132 is continuously movable between the unclamped configuration and a fully clamped configuration through a series of intermediate clamped configurations. In the unclamped configuration, shown in FIGS. 8A and 9A, the jaw carrier 232 is in a first rotational position. Each jaw 240 is in a first radial position with the pin 264 positioned in the slot 256 adjacent the first path end 268. In the intermediate clamped configurations, such as the one shown in FIGS. 8B and 9B, the jaw carrier 232 rotates through an angular range corresponding to an angular range a (FIG. 8) of the slots 256 with respect to the central axis C. In each intermediate configuration, the jaw carrier 232 is rotated counterclockwise away from the first rotational position. In the intermediate configurations, the pin 264 of the jaw 240 is positioned along the pathway in the slot 256 between the first path end 268 and the second path end 272. In the intermediate position, the jaws 240 are closer to the central axis C than the jaws 240 in the first radial position. In the fully clamped configuration, shown in FIGS. 8C and 9C, the jaw carrier 232 is in a final rotational position. Each jaw 240 is in a final radial position where the pin 264 is positioned in the slot 256 adjacent the second path end 272. The jaws 240 are closer to the central axis C when in the final radial position than when in the first radial position.

The clamp assembly 132 allows an operator to clamp different sizes of conduit by rotating the jaw carrier 232 until the clamp surfaces 260 of the jaws 240 engage the cable jacket 101 of the cable 100. The fully clamped configuration may correspond to a cable 100 with a small diameter. While not discussed herein, the clamp assembly 132 includes a latch assembly configured to maintain the position of the jaw assembly 224 once the desired configuration has been reached. The latch assembly may use any one of a number of known methods and may engage the jaw carrier 232 or other portions of the jaw assembly 224.

To operate the cable stripping assembly 10 to perform a cable stripping operation, the adjustable bushing 120 is coupled to the cable stripping tool 20 by positioning the tool adapter 144 in the receiving channel 48 until the retaining feature 52 engages the coupling feature 148. Additionally, the adjustable blade assembly 128 changes a cutting depth of the blade 172. In some cases, the cutting depth can be set before cable 100 is inserted through the opening 229, assuming the cable diameter is known, or can be set after the cable 100 is inserted. To change the cutting depth of the blade 172, the operator engages the tab 204 to slide the adjustment bar 176 with respect to the mounting block 168. In an exemplary operation, the cable diameter requires the cutting depth to be increased (e.g., the distance d decreased and the distal end 184 of the blade 172 may be moved closer to the central axis C). The operator slides the adjustment bar 176 outward, so the tab 204 moves away from the mounting block 168, and the biasing member 212 drives the blade 172 to rotate in the second direction 216 (FIG. 4) until the wedge surface 208 engages the cam surface 192 to hold the blade 172. The operator may slide the adjustment bar 176 to align with markings or indicia indicating the cutting depth or cable diameter associated with the position of the adjustment bar 176. In some embodiments, prior to insertion of the cable 100, the operator may push the adjustment bar 176 inwards to decrease the cutting depth (e.g., move the blade 172 away from the central axis C). The cable 100 may then be positioned in the cavity 152, and the operator may retract the adjustment bar 176 until the cutting edge on the distal end 184 of the blade 172 bites into the cable jacket 101.

Once an end 102 of the cable 100 has been inserted through the opening 229 in the clamp assembly 132 and positioned in the cavity 152, the clamp assembly 132 may be moved from an initial unclamped position. The operator may grasp the jaw carrier 232 and rotate the jaw carrier 232 with respect to the main body 124 about the central axis C. In some embodiments, the jaw carrier 232 may include an outer grip surface including texturing features to enhance the operator's grip. As the jaw carrier 232 rotates, the cradles 236 move the jaws 240 circumferentially about the central axis C. Circumferential movement of the jaw carrier 232 and the jaws 240 is translated into radial movement of the jaws 240 by the slots 256 in the guide plates 220. As the jaws 240 move, the pins 264 travel along the slots 256 away from the first path end 268. The jaw carrier 232 may be rotated until the clamp surfaces 260 engage the cable jacket 101 of the cable 100 positioned in the cavity 152. In the illustrated embodiment, each jaw 240 includes a pair of clamp surface 260 and is configured to support a set of balls (see FIGS. 9A-9C) to roll over the cable jacket 101 as the cable 100 is fed through the bushing 120 during the cable stripping operation. The jaw assembly 224 may be locked by a locking mechanism (not shown) to secure the jaw carrier 232 against rotating relative to the main body 124 and secure the cable 100 in the cavity 152 to generally align with the central axis C.

The cable stripping assembly 10 may be operated once the blade assembly 128 and clamp assembly 132 have been adjusted to the desired positions and the cable 100 has been received in the cavity 152. The operator may actuate the trigger 36 of the tool 20 to supply power from the battery 40 to the motor 32. The motor 32 drives the output end 44 to rotate, and the rotation is transmitted to the adjustable bushing 120 via the tool adapter 144. Rotation of the adjustable bushing 120 causes the blade 172 to rotate about the central axis C, scoring or cutting the cable jacket 101 of the cable 100. In some embodiments, the cable stripping assembly 10 propels itself along the cable 100 by nature of the engagement of the clamp surfaces 260 of the jaws 240 or by the angle of the blade 172. In some embodiments, the operator propels the cable stripping assembly 10 along the cable 100. As the cable stripping assembly 10 moves along the cable 100, the blade 172 cuts the cable jacket 101 away exposing the wires 103. In some embodiments, the window 156 allows a strip of removed cable jacket 101 to exit the cavity 152. As the cable stripping assembly 10 moves along the cable 100, the cable 100 (specifically the exposed wires 103) passes through the opening 146 in the tool adapter 144 and into the receiving channel 48 of the tool 20. If the length of cable that needs to be stripped exceeds a certain amount, the cable end 102 may emerge from the receiving channel 48 at an opposite end of the head 28. Once the desired cable length has been stripped, the trigger 36 can be released and the motor 32 deactivated. The strip or spiral of removed cable jacket may be fully severed from the rest of the cable jacket 101. In some embodiments, the tool 20 may be operated in reverse to backtrack and move the cable stripping assembly off the cable 100. In some embodiments, the adjustment bar 176 is pushed all the way in to minimize the cutting depth and the jaw carrier 232 is rotated back to the initial rotational position, allowing the cable 100 to be pulled through the cavity 152 and out the opening 229 without actuation of the motor 32.

After completion of the cable stripping operation, the cable stripping assembly 10 may be stored. In some embodiments, the adjustable bushing 120 may be stored separately from the tool 20. The adjustable bushing 120 offers the advantage of being able to strip a variety of cables with the same device. This adjustability decreases the number of components needed to be stored and transported by the operator while maintaining or increasing the capabilities of the system 10. In some embodiments, the adjustability of the bushing 120 provides the added benefit of not needing to frequently remove the bushing 120 from the tool 20. The adjustable bushing 120 and the cable stripping assembly 10, therefore, offer a portable and versatile system for performing a cable stripping operation.

FIGS. 10-12C illustrate an alternate embodiment of a clamp assembly 132'. The clamp assembly 132' is generally similar to the clamp assembly 132 discussed above, and similar parts are referenced using similar reference numbers with a ' mark. The discussion hereafter focuses on the differences between the embodiments, so features of the clamp assembly 132' not described can generally be assumed to be the same as or similar to the features of the clamp assembly 132 of FIGS. 6-9C.

Figure 10:
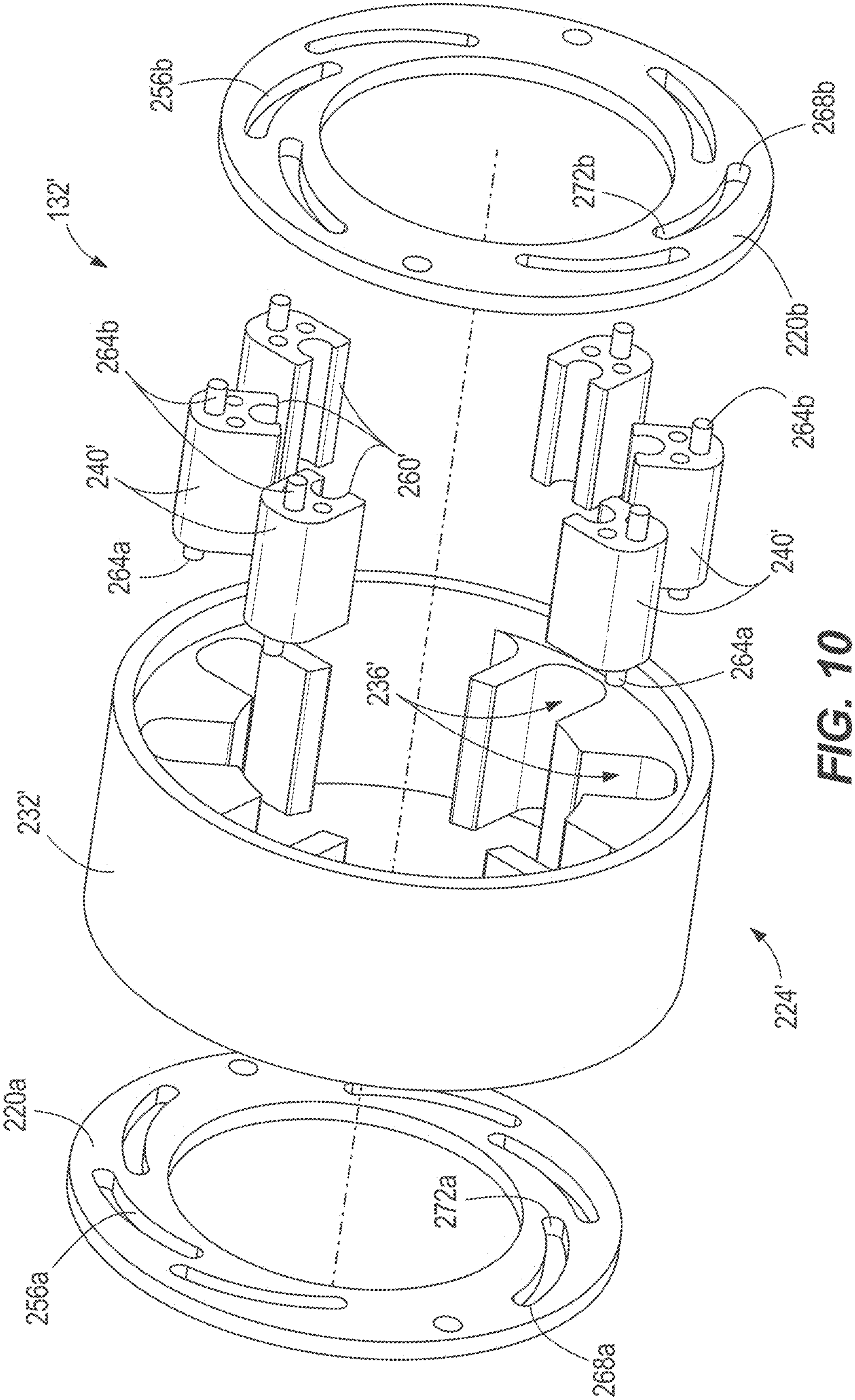
FIG. 10 is an exploded view of an alternate clamp assembly for use with the bushing of FIG. 2 including a first guide plate and a second guide plate.

With reference to FIG. 10, the clamp assembly 132' includes a jaw assembly 224' and a pair of guide plates **220*a*, 220*b*. In some embodiments, the clamp assembly 132' may include an end plate (not shown) similar to the end plate 228. The jaw assembly 224' includes a plurality of jaws 240' and a jaw carrier 232' having a plurality of cradles 236' each configured to receive one of the jaws 240'. Each of the jaws 240' has at least one clamp surface 260' and a pair of pins 264' extending from opposite ends of the jaw 240'. The pair of pins 264' include a first pin 264*a* and a second pin 264*b*, also referred to herein as the upper pin 264*a* and the lower pin 264*b*. The pair of guide plates 220*a*, 220*b* includes a first guide plate 220*a* and a second guide plate 220*b*. The first guide plate 220*a* includes a set of slots 256*a*. The pins 264*a* of the jaws 240' travel along a pathway defined by the slots 256*a* between a first end 268*a* and a second end 272*a*. In the illustrated embodiment, the guide plate 220*a* is substantially the same as the guide plate 220 shown in FIG. 8 and includes arcuate slots with the first end 268*a* radially farther from the central axis C than the second end 272*b*. When following the slot 256*a* from the first end 268*a* to the second end 272*b*, the pathway includes a circumferential component in the counterclockwise direction (as seen in FIG. 10) and a radial component in the inward direction. In other embodiments, the slots 256*a*** may have a different profile defining a different path.

With continued reference to FIG. 10, the guide plate **220*b* includes slots 256*b*. The pins 264*b* of the jaws 240' travel along a pathway defined by the slots 256*b* between a first end 268*b* and a second end 272*b*. In the clamp assembly 132' illustrated in FIGS. 10-12C, the guide plate 220*b* is a mirror image of the guide plate 220*a*. In embodiments where the slots 256*a*, 256*b* extend through the guide plates 220*a*, 220*b*, the second guide plate 220*b* may be the same component as the guide plate 220 shown in FIG. 8 but positioned so a circumferential component of the pathway extends in the clockwise direction (as seen in FIG. 10). The illustrated configuration offers the advantage of simplifying production by requiring fewer distinct components. In embodiments where the slots 256***a*, 256*b* are grooved or recessed into a surface, the slots 256*b* on the guide plate 220*b* may be a mirror image of the slots 256*a* of the guide plate 220*a*. In still further embodiments, the guide plate 220*b* may be completely different from the guide plate 220*a* and may include a different profile defining a different path.

The clamp assembly 132' is coupled to the main body 124 such that the first guide plate 220*a* rotates with the main body 124. The jaw assembly 224' is positioned between the first guide plate 220*a* and the second guide plate 220*b*. The jaw carrier 232' is rotatable with respect to the first guide plate 220*a*, and thus the main body 124, and the second guide plate 220*b* is rotatable with respect to the jaw carrier 232' and the first guide plate 220*a*.

Turning now to FIGS. 11A-12C, the clamp assembly 132' is movable between an unclamped, retracted, configuration and one or more clamped, extended, configurations in which at least a portion of the jaws 240' extend into the cavity 152 to engage the cable 100. The clamp assembly 132' is continuously movable between the unclamped configuration and a fully clamped configuration through a series of intermediate clamped configurations.

Figure 11A:
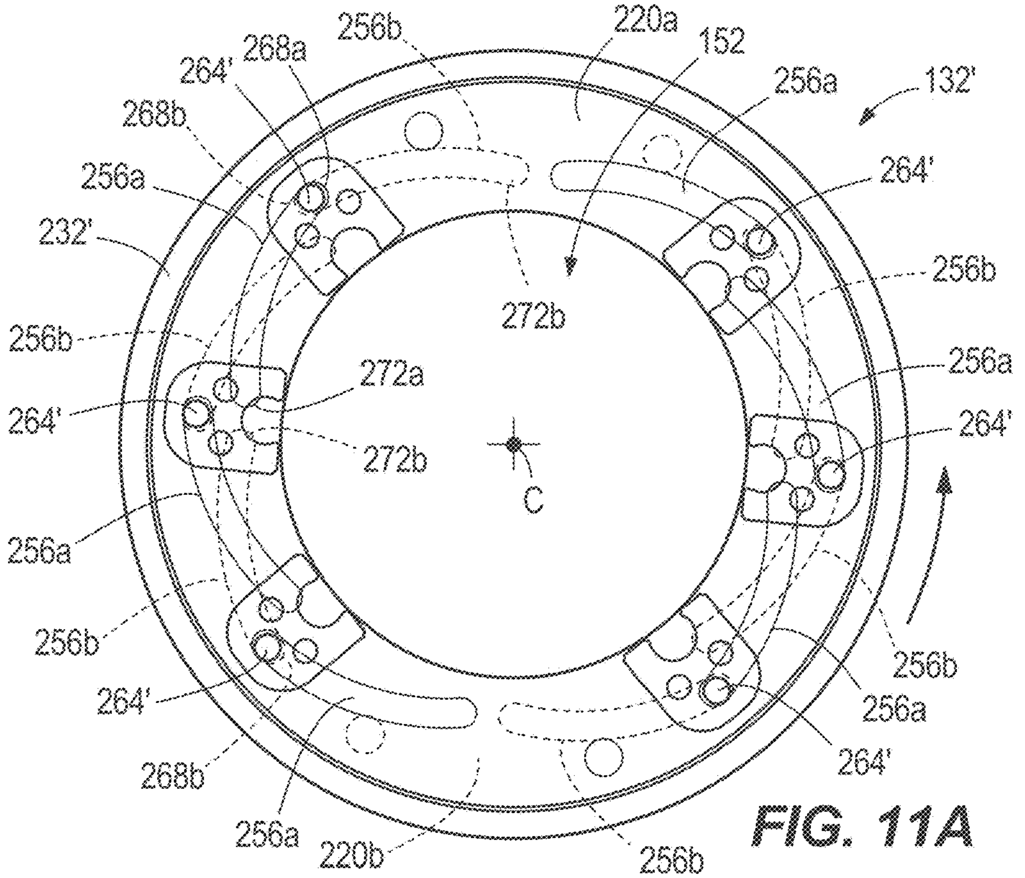
FIG. 11A is a bottom view of the clamp assembly of FIG. 10 with the second guide plate in phantom lines, the clamp assembly in a first, retracted position.
Figure 12A:
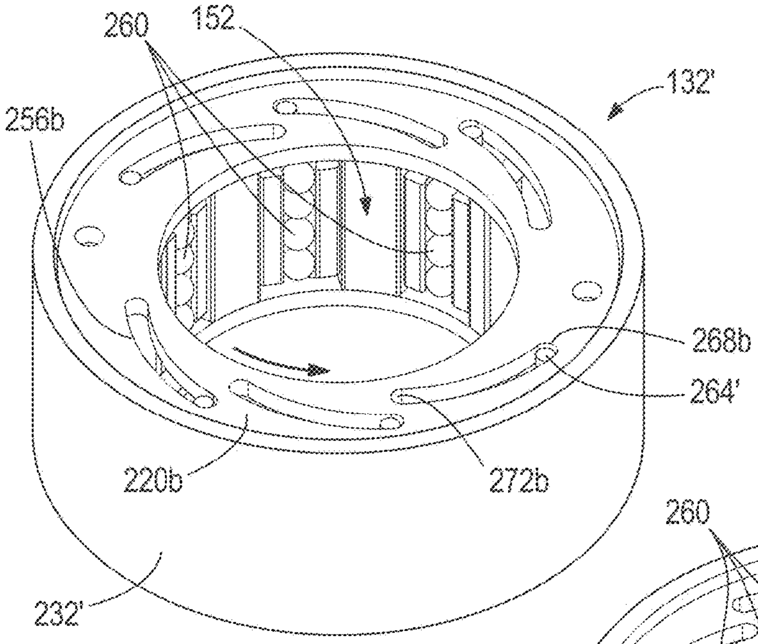
FIG. 12A is a perspective view of the clamp assembly of FIG. 10 in the first position.

In the unclamped configuration, shown in FIGS. 11A and 12A, the jaw carrier 232' is in a first carrier position and the second guide plate 220*b* is in a first plate position. Each jaw 240' is coupled between the guide plates 220*a*, 220*b* in a first radial position. The jaw 240' is positioned at the beginning of each pathway. The pins 264*a* are adjacent the first end 268*a* of the slot 256*a* and the pins 264*b* are adjacent the first end 268*b* of the slot 256*b*.

Figure 11B:
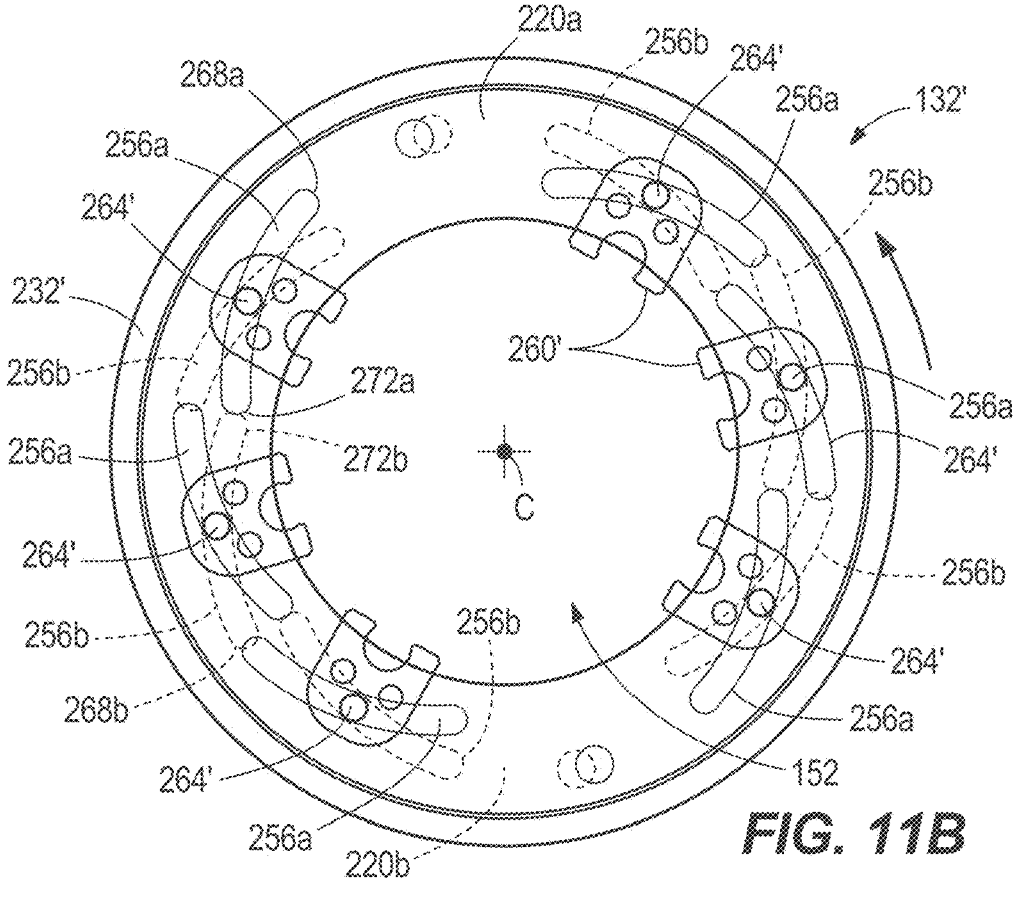
FIG. 11B is a bottom view of the clamp assembly of FIG. 11A in a second, intermediate position.
Figure 12B:
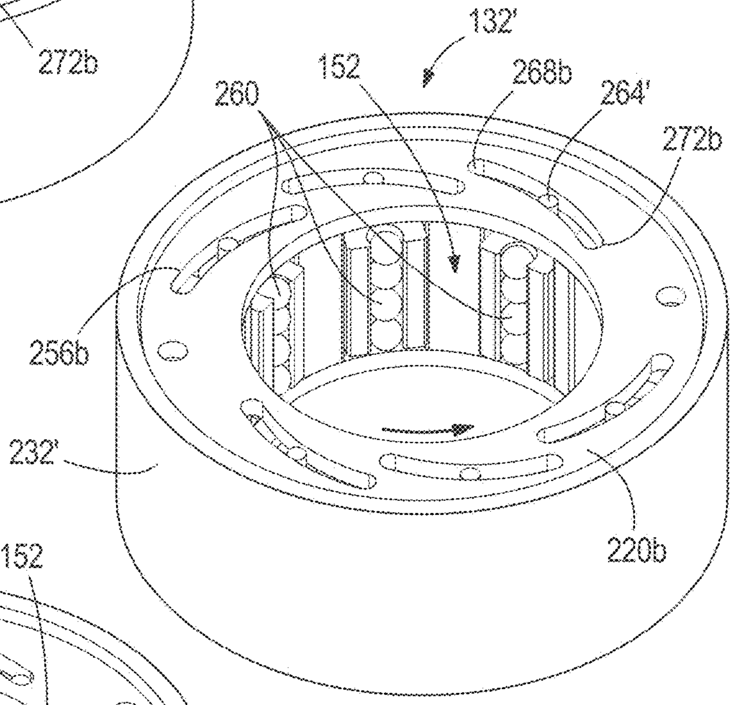
FIG. 12B is a perspective view of the clamp assembly of FIG. 12A in the second position.

In the intermediate clamped configurations, such as the one shown in FIGS. 11B and 12B, the jaw carrier 232' is rotated away from the first carrier position with respect to the first guide plate 220*a* and the main body 124. The second guide plate 220*b* is rotated away from the first plate position with respect to the first guide plate 220*a* and the main body 124. The second guide plate 220*b* and the jaw carrier 232' rotate in the same direction. The jaw carrier 232' rotates relative to the second guide plate 220*b*. In the illustrated embodiment, the jaw carrier 232' rotates at half the speed of the second guide plate 220*b*. Thus, in any of the intermediate positions, the angular difference between the current position of the jaw carrier 232' and the first carrier position is half the angular difference between the second guide plate 220*b* and the first plate position. As the jaw carrier 232' rotates away from the first carrier position, each jaw 240' slides in the cradle 236' and moves radially inward with respect to the central axis C from the first radial position. The pin 264*a* is positioned between the first end 268*a* and the second end 272*a* of the slot 256*a*. Similarly, the pin 264*b* is positioned between the first end 268*b* and the second end 272*b* of the slot 256*b*.

Figure 11C:
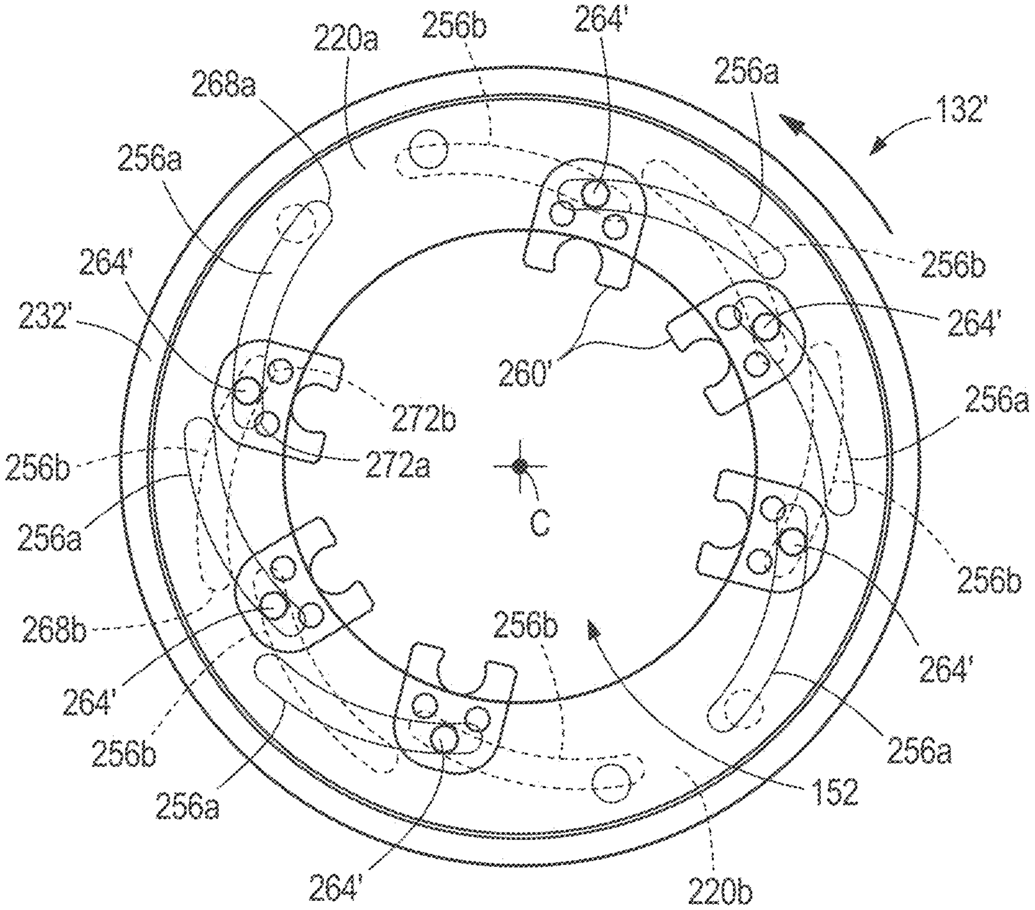
FIG. 11C is a top view of the clamp assembly of FIG. 11A in a third, extended position.
Figure 12C:
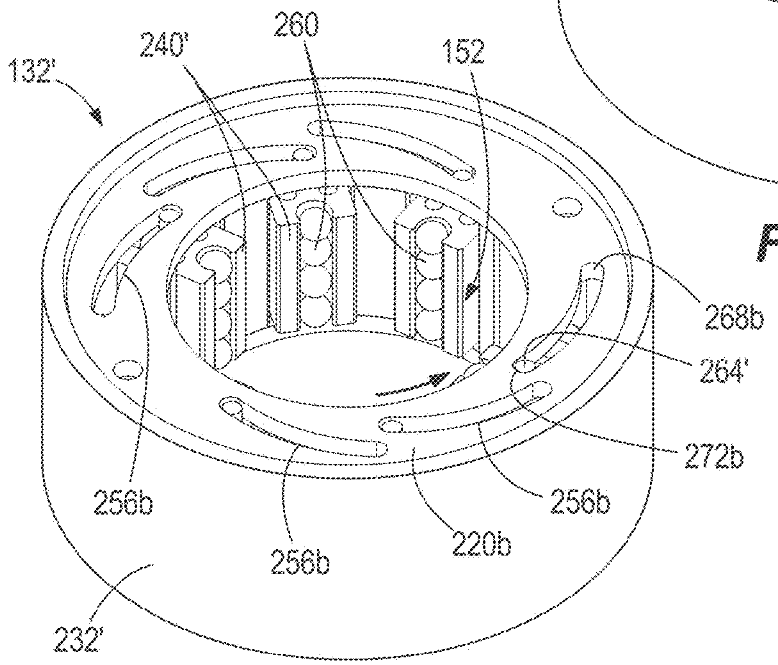
FIG. 12C is a perspective view of the clamp assembly of FIG. 12A in the third position.

In the fully clamped configuration, shown in FIGS. 11C and 12C, the jaw carrier 232' is in a final rotational position. Each jaw 240' is in a final radial position at least partially extending into the cavity 152. The pin 264*a* is adjacent the second end 272*a* of the slot 256*a* and the pin 264*b* is positioned adjacent the second end 272*b* of the slot 256*b*.

To clamp a cable 100, the clamp assembly 132' is moved from the unclamped configuration to one of the clamped configurations. The operator may operate the clamp assembly 132' in multiple ways. In a first way, similar to the clamp assembly 132 discussed above, the operator grasps the jaw carrier 232' and rotates the jaw carrier 232' with respect to the main body 124 about the central axis C. As the jaw carrier 232' rotates, the cradles 236 and the first guide plate 220*a* cooperate to move the jaws 240' radially inward toward the central axis C. As the jaws 240' move relative to the first guide plate 220*a*, the lower pins 264*b* travel along the slot 256*b*, causing the second guide plate 220*b* to rotate. The jaw carrier 232' may be rotated until the clamp surfaces 260 engage the cable jacket 101 of the cable 100 positioned in the cavity 152. In a second way, the operator directly rotates the second guide plate 220*b*. In some embodiments, the second guide plate 220*b* may include a tab or other feature designed to be engaged by the operator's hand. Rotation of the second guide plate 220*b* is transmitted to the jaws 240' by the slots 256*b* so the pins 264*b* travel along the slot 256*b*. The movement of the jaws 240' is transmitted to the jaw carrier 232' by the cradles 236', and the jaw carrier 232' rotates with respect to the main body 124. The movement of the jaws 240' also moves the pins 264*a* along the slots 256*a* in the first guide plate 220*a*. The clamp assembly 132' offers the advantage of a quick-clamp option (operated in the first way) or a precision option (operated in the second way). The quick-clamp option allows the operator to quickly engage cable 100 with a small diameter by requiring less rotation to move radially inwardly. The precision option allows for more accurate positioning of the jaws 240'. In some cases, the operator may use a combination of both the quick-clamp option and the precision option to position the jaws 240' before locking the clamp assembly to prevent rotation of the jaw carrier 232' or the second guide plate 220*b* with respect to the main body 124.

The embodiments described above and illustrated in the figures are presented by way of example only and are not intended as a limitation upon the concepts and principles of the present subject matter. As such, it will be appreciated that variations and modifications to the elements and their configuration and/or arrangement exist within the spirit and scope of the one or more independent aspects as described.

Various features and advantages of the invention are set forth in the following claims.

What is claimed is:

1. A cable stripping assembly for removing a cable jacket from a cable, the assembly comprising:

a main body extending along a central axis and including a cavity configured to receive the cable;

a window in the main body in communication with the cavity;

a blade including a cutting edge, the blade coupled to the main body adjacent the window with the cutting edge at least partially in the cavity, wherein the blade is rotatable relative to the main body about a pivot axis to vary a distance between the cutting edge and the central axis;

an adjustment bar configured to engage the blade to rotate the blade about the pivot axis, wherein the adjustment bar is slidable relative to the main body, the blade includes a cam surface, the adjustment bar includes a wedge surface configured to engage the cam surface of the blade, and sliding movement of the adjustment bar causes rotation of the blade; and a biasing member configured to bias the blade to rotate the cutting edge toward the central axis.

2. The cable stripping assembly of claim 1, further comprising a motor unit configured to drive the main body about the central axis.

3. The cable stripping assembly of claim 1, wherein the pivot axis is inclined relative to the central axis.

4. The cable stripping assembly of claim 1, wherein the blade rotates about the pivot axis in a plane, and wherein the adjustment bar is slidable within the plane.

5. The cable stripping assembly of claim 1, further comprising a clamp assembly coupled to the main body and configured to hold the cable in the cavity, the clamp assembly including a jaw carrier, a guide plate, and a plurality of jaws supported by the jaw carrier and configured to engage the cable jacket of the cable.

6. The cable stripping assembly of claim 5, wherein the guide plate includes a plurality of arcuate slots and each of the plurality of jaws travels along an associated one of the plurality of arcuate slots, and rotation of the jaw carrier relative to the guide plate moves the plurality of jaws radially inward.

7. The cable stripping assembly of claim 1, further comprising a motor unit including a housing, a motor disposed in the housing, and an output end driven to rotate by the motor, wherein the main body is coupled for corotation with the output end.

* * * * *